3,219,628
POLYMERS OF DIHYDROXYLATED ARYL COMPOUNDS WITH CHLOROMETHYLATED COMPOUNDS
James D. Doedens, Midland, Earl H. Rosenbrock, Auburn, and Norman T. Hebert, Bay City, Mich., assignors to The Dow Chemical Company, Midland, Mich., a corporation of Delaware
No Drawing. Filed May 29, 1961, Ser. No. 113,096
7 Claims. (Cl. 260—61)

The present invention relates to new and useful resinous materials and more particularly concerns a class of new and useful copolymers having the following characteristic repeating unit

{O—A—O—CH₂—B—CH₂} wherein —A— represents a divalent aromatic radical of the benzene series or a phenyleneoxy phenylene radical (i.e., the residue remaining after removal of two hydroxyl groups from a polyhydroxy aryl compound) and, wherein —B— represents the internal aryl radical of an aromatic chloromethylated compound, after removal of the chloromethyl moieties, and having an average of two chloromethyl groups. The radicals —A— and —B— can be represented as a member selected from the group consisting of divalent radicals having the formula

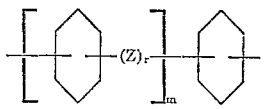

wherein Z represents oxygen, alkylene, alkylidene, —S— or —SO₂—; r represents an integer of from 0 to 1; and, m represents an integer from 0 to 5.

These new resinous copolymers are useful in the preparation of polymers by reaction with formaldehyde-furnishing compounds such as hexamethylene tetramine, formaldehyde, paraformaldehyde and the like to prepare thermoset resins. These and other uses will become apparent to those skilled in the art to which the present invention pertains from the following specification and claims.

The novel copolymers of the present invention conveniently can be prepared by reacting a hydroxylated aromatic compound of the class hereafter defined with a bis- or a poly(chloromethylated) aromatic compound at a temperature of from about 50° C. to about 150° C. and in the presence of a base. The ratio of reactants is not critical, some of the desired product being produced with any ratio. However, when less than stoichiometric quantities of either component are employed, the terminal moiety of the copolymer will be that moiety resulting from the component employed in excess. It is preferable in most instances to employ an excess of the hydroxylated aromatic compound since a more desirable product is obtained when the terminal moieties contain the aromatic hydroxyl group. Good yields of the desired product are obtained when the hydroxylated aromatic reactant is employed in at least a slight excess over stoichiometric quantities. However, the hydroxylated reactant may be employed in from .8 to 10 moles per mole of chloromethylated compound. Upon completion of the reaction, the unreacted reactants are removed by conventional means such as distillation under reduced pressure, or the like.

The hydroxylated aromatic compounds which can be used as starting materials are those dihydroxy aromatic compounds free of substituents other than halogen, alkyl or aryl. Such polyhydroxy aromatic compounds include the dihydroxy compounds such as pyrocatechol, resorcinol, hydroquinone, their halogenated and alkylated derivatives such as chloropyrocatechol, bromoresorcinol, homopyrocatechol and the like, the bisphenols, such as diphenol, bisphenol A (2,2-bis(hydroxyphenol)propane), 1,1 - bis-(hydroxyphenyl)ethane, 2,2 - bis(hydroxyphenyl)butane, bis(p - hydroxyphenyl)methane, bis(o - hydroxyphenyl)-methane, 2,2 - bis(chloro - p - hydroxyphenyl)propane, and the like, and the diphenol ethers and diphenol thioethers such as bis(p-hydroxyphenyl)ether, bis(p-hydroxyphenyl)thioether and the like, and the nuclear mono, di and polyhalogenated, alkylated and arylated derivatives thereof.

The chloromethylated aromatic compounds which can be employed in accordance with the present invention are the chloromethylated derivatives of aromatic compounds of the benzene series, diphenyl, diphenylene alkane, diphenyl ethers, for example, the bis(chloromethyl)benzenes including the nuclear halo-, alkyl-, alkoxy-, and aryl-substituted benzenes; the bis(chloromethylphenyl) compounds such as bis(chloromethyl)biphenyl, bis(chloromethylphenyl)oxide, bis(chloromethylphenyl)alkanes, including the nuclear halo-, alkyl-, alkoxy-, and aryl-substituted compounds, as well as mixtures of the mono, di and higher chloromethylated derivatives.

The following examples are illustrative of the present invention but are not to be construed as limiting.

*Example 1*

69 grams of chloromethylated diphenyl oxide having an average of two chloromethyl groups per diphenyl oxide moiety (0.25 mole) and 60 g. of bisphenol-A (0.25 mole) were dissolved in 100 ml. of dioxane and placed in a suitably sized 3-necked reaction flask equipped with a mechanical agitator, reflux condenser, and thermometer. To this mixture was added 22.5 g. of NaOH dissolved in 50 ml. of dioxane over a 5-minute period with agitation. After complete addition, the mixture was heated to 83° C. and held at this temperature for 2 hours. The reaction mixture was cooled to room temperature and washed with warm water until all of the sodium chloride was removed. The resulting white powder was filtered and dried to remove water. Analysis showed no phenolic hydroxy groups, p-substitution and absence of chloromethyl groups. It is believed that the compound prepared had the following structure:

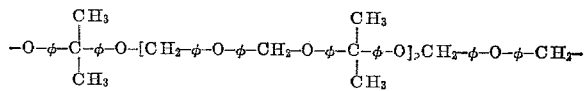

φ represents

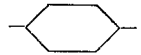

*Example 2*

The product of Example 1 was ground to a fine powder, mixed with 10 percent by weight of hexamethylenetetramine, and placed in a mold. The material was cured at 200°C. and 500 p.s.i. The resulting product was a clear, transparent plate.

*Example 3*

Sodium hydroxide (22.5 g.) was added to 150 g. water in a suitable glass reactor equipped with a thermometer, mechanical agitator, and reflux condenser. Bisphenol S (bis(hydroxyphenyl)thioether) was added to the mixture until all of the bisphenol went into solution. Bis-chloromethylated diphenyl oxide (69 g.) was added to the above mixture with stirring. The mixture was then heated to 100° C. in 0.5 hour and maintained thereat for 2 hours. It was then cooled to room temperature, and the crystalline material which formed was recovered by filtration. The crystals were washed with water and the product dried at 85° C. for 16 hours. The products (98 g.) had the following generic structural configuration:

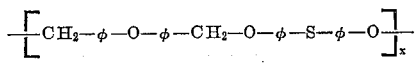

wherein φ represents

Example 4

In the manner of Example 3, by employing the following charge

| | G. |
|---|---|
| Chloromethylated diphenyl oxide (having a chlorine content of 25.2%) | 69.0 |
| Resorcinol | 27.5 |
| Sodium hydroxide | 22.5 |
| Water | 150.0 | there was obtained 65 g. of a product having the following structural configuration

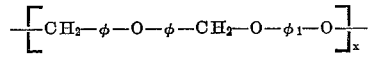

wherein φ represents

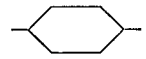

and wherein φ₁ represents

Example 5

In a manner similar to that employed in Example 1, the charge being as follows

| | G. |
|---|---|
| Chloromethylated diphenyl oxide (having a chlorine content of 25%) | 34.5 |
| Biphenol sodium salt (as an aqueous 8.5% solution of sodium biphenate) | 28.5 | there was obtained 57 g. of a product having the following structural configuration

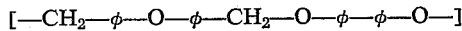

wherein φ represents

The products of Examples 3, 4 and 5 were then mixed individually with 15%, by weight, of hexamethylenetetramine. The mixtures were ground in a micropulverizer to insure complete mixing and finer size. Samples were added to 2" diameter x ½" circular steel mold and were compressed to ¼". The mold was placed into a press heated to 340° F. and the samples pressed at 200 p.s.i. for 3 minutes. All the samples cured to thermoset resins in the form of a disk 2" in diameter and ¼" thick. The samples behaved the same as the bisphenol A-chloromethylated disphenyl oxide reaction products of Example 1.

We claim:
1. The resinous product of the reaction of a dihydroxylated aryl compound selected from the group consisting of dihydroxy benzenes, bisphenols, diphenols, diphenol ethers and diphenol thioethers, each being free of substituents other than halogen, alkyl and aryl, with a chloromethylated compound selected from the group consisting of diphenyl, diphenyl alkane and diphenyl ether containing an average of at least nuclear chloromethyl groups and free from substituents reactive under the conditions of reaction, in the presence of sodium hydroxide at a temperature of from about 50° to 150° C.
2. The polymer formed by the condensation of (1) a bisphenol free of substituents other than halogen, alkyl and aryl; with (2) about 0.1 to 1.2 molar equivalents of a chloromethylated diphenyl ether containing an average of at least 2 chloromethyl groups and free from substituents reactive under the conditions of reaction, said condensation being effected by heating a mixture of the reactants (1) and (2) at a temperature of from about 50° to 150° in the presence of a base.
3. The process of reacting a bis-chloromethylated aryl compound selected from the group consisting of dihydroxy benzenes, bisphenols, diphenols, diphenol ethers, and diphenol thioethers, and a dihydroxyaryl compound selected from the group consisting of diphenyl, diphenyl alkane and diphenyl ethers each being free from substituents other than halogen, alkyl and aryl in the presence of sodium hydroxide at a temperature of from about 50° to 150° C. and recovering a resinous product having the approximate general formula:

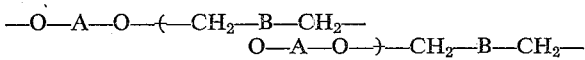

wherein A repersents the residue of the dihydroxyaryl compound after removal of the hydroxyl groups and B represents the internal aryl residue of the chloromethylated aryl compound after removal of the chloromethyl groups.
4. A resinous composition consisting essentially of 2,2'-bis(hydroxyphenyl)propane reacted with bis(chloromethylphenyl)ether in the presence of sodium hydroxide at a temperature of from 50° to 150° C.
5. A resinous composition consisting essentially of bis(hydroxphenyl)thioether reacted with bis(chloromethylphenyl)ether in the presence of sodium hydroxide at a temperature of from 50° to 100° C.
6. A resinous composition consisting essentially of resorcinol reacted with bis(chloromethylphenyl)ether in the presence of sodium hydroxide at a temperature of from 50° to 150° C.
7. A resinous composition consisting essentially of diphenol reacted with bis(chloromethyphenyl)ether in the presence of sodium hydroxide at a temperature of from 50° to 150° C.

References Cited by the Examiner

UNITED STATES PATENTS

| | | | |
|---|---|---|---|
| 2,060,715 | 11/1936 | Arvin | 260—61 |
| 2,075,343 | 3/1937 | De Witt | 260—61 |
| 2,873,299 | 2/1959 | Mikeska | 260—2 |
| 3,054,773 | 9/1962 | Wilgus | 260—61 |
| 3,128,259 | 4/1964 | Sonnobend | 260—61 |

FOREIGN PATENTS 835,499  5/1960  Great Britain.

WILLIAM H. SHORT, *Primary Examiner.*

HAROLD N. BURSTEIN, *Examiner.*